United States Patent
Feng et al.

(10) Patent No.: US 6,995,866 B2
(45) Date of Patent: Feb. 7, 2006

(54) METHOD AND APPARATUS FOR BACKGROUND ADJUSTMENT IN COLOR REPRODUCTION DEVICES

(75) Inventors: Xiao-fan Feng, Vancouver, WA (US); Jon Matthew Speigle, Vancouver, WA (US); John Charles Dalrymple, Portland, OR (US); James Zhixin Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 788 days.

(21) Appl. No.: 09/808,862

(22) Filed: Mar. 14, 2001

(65) Prior Publication Data

US 2002/0159080 A1 Oct. 31, 2002

Related U.S. Application Data

(60) Provisional application No. 60/233,909, filed on Sep. 20, 2000.

(51) Int. Cl.
*G06F 15/00* (2006.01)
*B41J 1/00* (2006.01)

(52) U.S. Cl. .......................... 358/1.9; 358/518
(58) Field of Classification Search ................ 358/1.9, 358/518, 474
See application file for complete search history.

(56) References Cited

U.S. PATENT DOCUMENTS

| | | | |
|---|---|---|---|
| 4,970,605 A | 11/1990 | Fogaroli et al. | |
| 5,166,808 A | 11/1992 | Kawata | |
| 5,289,296 A | 2/1994 | Yamada | |
| 5,317,420 A | 5/1994 | Kuwahara | |
| 5,489,989 A | 2/1996 | Shimizu et al. | |
| 5,706,368 A | 1/1998 | Mita | |
| 5,724,444 A | 3/1998 | Yamanishi | |
| 5,850,298 A | 12/1998 | Narahara et al. | |
| 6,204,939 B1 * | 3/2001 | Lin et al. | 358/518 |
| 6,323,957 B1 * | 11/2001 | Ball | 358/1.9 |
| 6,359,703 B1 * | 3/2002 | Yabe | 358/1.9 |
| 6,757,081 B1 * | 6/2004 | Fan et al. | 358/474 |

FOREIGN PATENT DOCUMENTS

JP  09051443  7/2004

* cited by examiner

*Primary Examiner*—Kimberly Williams
*Assistant Examiner*—Charlotte M. Baker
(74) *Attorney, Agent, or Firm*—Marger Johnson & McCollom, P.C.

(57) ABSTRACT

A method for background adjustment. A background lightness level in an original image is estimated. Pixels are then converted to a luminance-chrominance color space. Pixels have lightness levels equal to the background lightness level are mapped to a value corresponding to white as background pixels. Chroma values for the background pixels are compared to a threshold and adjusted as needed, either by adjusting the lightness value or by removing the chrominance values. The luminance-chrominance data is then converted to output space.

16 Claims, 4 Drawing Sheets

METHOD AND APPARATUS FOR BACKGROUND ADJUSTMENT IN COLOR REPRODUCTION DEVICES

This application claims the benefit of Provisional Appl. No. 60/233,909 filed Sep. 20, 2000.

BACKGROUND

1. Field

This disclosure relates to color copiers, more particularly to a method for adjusting background colors in color copiers.

2. Background

Color reproduction devices, such as copiers and fax machines, typically have a processing pipeline that converts a scanned image into data, and then processes the data into the appropriate format for printing. For example, a user places a color original on the platen of a color copier or into the tray of a fax machine. The device scans the document using a set of red, green and blue (RGB) sensors and produces a data representation in terms of the RGB signals at each location on a pixel grid. In many applications, the RGB data is then converted to a luminance/chrominance color space because this space makes it possible to separately process chromatic and intensity information. Additionally, it is possible to represent the chromatic and intensity information at different resolutions, thus the image in the luminance-chrominance color space can be represented more compactly than in an RGB color space.

Luminance-chrominance color spaces typically have three components. One example of this type of color space is CIE Lab. "L" represents the dark-to-light lightness dimension. "a" and "b" represent the chrominance components. Although CIE LAB is also designed so that equal distances between points in the space are approximately equal in terms of perceived color difference, this feature is not central to the problem with which we are concerned. Other luminance-chrominance color spaces can be used where this property is not present. Technically, CIE L values are lightness and the exact definition is different than the definition of luminance. Either definition could be used to code the intensity information at a pixel. The intensity dimension will be referred to here as lightness or L values.

In some cases, such as if the paper upon which the original image resides were not white, the background pixels of the LAB image would be printed as colors. This takes a longer amount of time and wastes toner or ink to render the background color, which was more than likely not desired. Most users that are copying from a colored piece of paper do not want the color reproduced. Typically, if users want a copy that is on colored paper, the user will load color paper into the copier before copying the original.

Currently, most copiers employ background suppression to eliminate the background paper color. Most perform this suppression in the lightness component only. The lightness of the background pixels are typically mapped to white, setting their lightness values to the corresponding white level for that copier. In most copiers, lightness will be set to white at 255, assuming 8-bit processing where values range from 0 to 255.

Once the LAB space is adjusted to suppress the background, the LAB data is mapped to the appropriate color space for that print engine. These are typically a cyan-magenta-yellow (CMY) space or a cyan-magenta-yellow-black (CMYK) space.

However, a problem occurs if a portion of the original has highlighting, where a lighter color is used to set off a darker object. Other examples exist, but the most common type is where text is highlighted with a light yellow, pink or blue highlight surrounding the text characters. Highlight colors are also frequently used in maps. With the usual method of color processing, the lightness of these pixels surrounding the text characters is mapped to white and the highlighting is not preserved in the color copy, which may have been desired.

Therefore, it would be useful to have a method of background suppression that allows preservation of these highlighted colors, while avoiding the unnecessary extra processing and toner/ink use that would occur with colored paper.

SUMMARY

An aspect of the disclosure is a method for background adjustment. A background lightness level in an original image is estimated. Pixels are then converted to a luminance-chrominance color space, such as LAB. Many luminance-chrominance spaces are well known in the prior art and would also be applicable. Pixels having lightness levels equal to the background lightness level are mapped to a value corresponding to white as background pixels. Chroma values for the background pixels are compared to a threshold and adjusted as needed, either by adjusting the lightness value or by removing the chrominance values. The LAB data is then converted to output space. Also disclosed is a color reproduction device having a chroma adjustment module.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
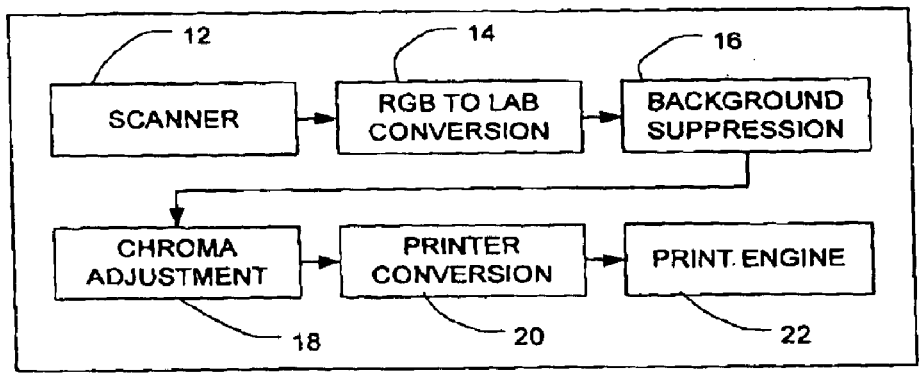
FIG. 1 shows a block diagram of one embodiment of a color reproduction device, in accordance with the invention.

FIG. 1 shows a typical pipeline architecture for a color copier. The original document is scanned on a scanner 12 to form red-green-blue (RGB) values. The RGB is converted to a luminance-chrominance color space such as LAB at 14, where L represent the luminance/lightness component and a and b are the chrominance components, sometimes referred to as C1 and C2. This particular color space will be referred to here as LAB rather than 'Lab', to prevent confusion. The chrominance components 'a' and 'b' will be referred to as such when referred to individually. Since most documents are not perfectly white and vary from one paper type to another, background suppression is employed at 16 to map paper background to white. If this process was not performed, the printer could render the light background color, using unnecessary resources and providing an undesirable result.

Background suppression is typically done using only the lightness component for low cost copiers, where the lightness of paper substrate is mapped to white. In a typically 8-bit printing application, this value is set at L=255. In current color reproduction devices, the background-suppressed data is then converted to output device space at 20, for printers this is typically either cyan-magenta-yellow-black (CMYK), or cyan-magenta-yellow (CMY). Output device space as used here is the color space used by the output device, and it will also be referred to as output space. Finally, the print engine in the reproduction device then prints the output space data at 22. Current systems do not include the chroma adjustment module 18 shown in FIG. 1, which will be discussed in more detail below.

Figure 2:
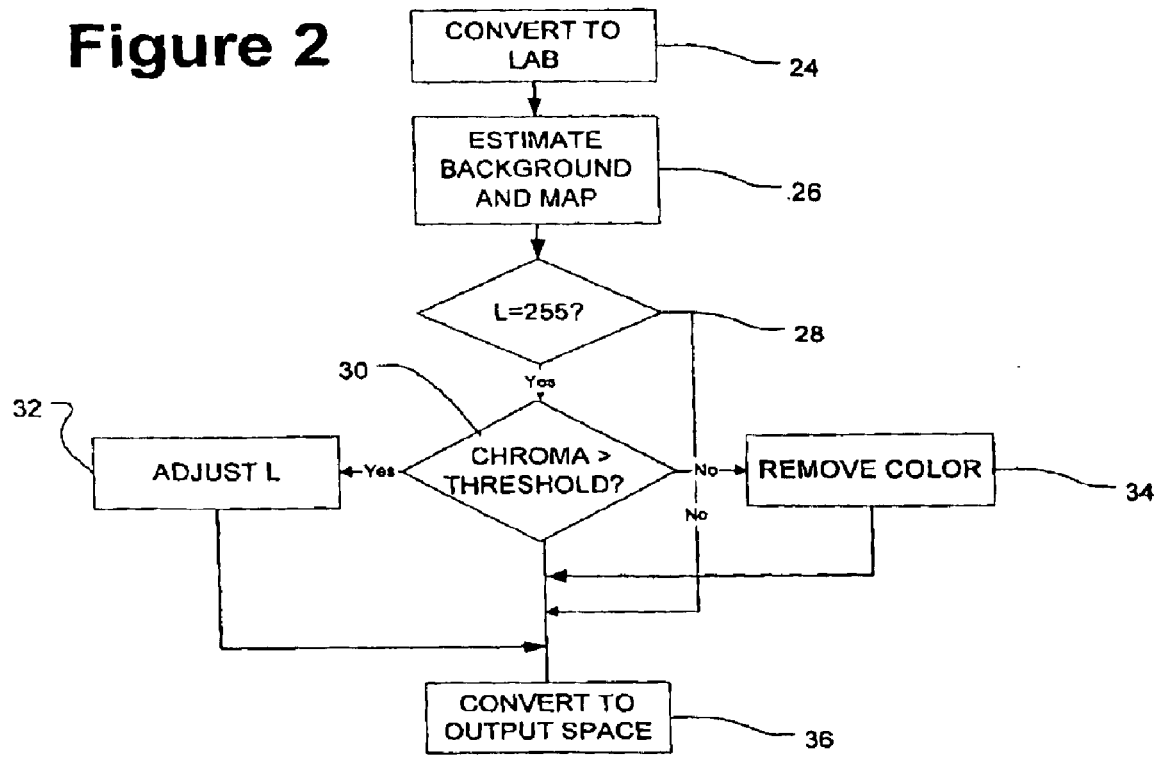
FIG. 2 shows a block diagram of one embodiment of a method for background adjustment, in accordance with the invention.

FIG. 2 shows one embodiment of a method to adjust chroma values to preserve highlight colors while suppressing background colors in accordance with the invention. Once the background level is determined, as will be discussed with regard to FIGS. 3, 4 and 5, it is mapped to white in the background suppression module.

The lightness mapping function maps the background lightness to the value corresponding to white, in the 8-bit example discussed previously, this is the value 255. However, it also maps the lightness of some highlight colors to white as well. This causes the difficulty in preserving these highlight colors. Additionally, many original document substrates are slightly colored, such that they have non-zero chrominance values a and b. These colored backgrounds can be reproduced causing a colored background in the reproduction. Typically, this appears as colored dots printed in background regions of the reproduction. These color dots can slow down the printing speed since they can prevent the printer from skipping white space, as well as unnecessarily consuming toner or ink.

The chrominance adjustment module 18 of FIG. 1 offers a solution to this problem. Once the background is mapped at 26 of FIG. 2, the value of lightness is checked to see if it is substantially equal to the value corresponding to white (L=White) at 28. The degree to which the value of lightness equals the lightness value corresponding to white is left to the system designer. As used here, a value substantially equal to the value corresponding to white may vary by up to two percent (2%). If the answer is 'No' then the pixel value is converted to output space at 26. If the lightness is equal to the value corresponding to white, the chroma value is compared to at least one threshold at 30.

In one embodiment, the chroma value C is substantially equal to $\sqrt{a^2+b^2}$. Other formulations of chroma can be used as well, such as C=|a|+|b|, or C=max(|a|, |b|). At each pixel, if the chroma is greater than a first threshold, then the color of that pixel is preserved. The lightness of that pixel is set to a lower value L at 32. If the chroma is less than or equal to a second threshold, the chroma is removed at 34 by setting a=0 and b=0. As an example, the two thresholds could both be set to 10, and lightness adjusted to 254. The modified values are then converted to the output color space. In another, both of the thresholds could be set to 20 for text mode, where the system is processing mostly text, and 10 for all other modes. All of the above specifics are merely for discussion purposes; no limitation on the scope of the invention is intended.

The two thresholds, the first for determining whether to preserve the chroma value, and the second for determining whether to remove the chroma may be equal or different. If these two thresholds are equal, effectively only one threshold is used. This choice is left to the system designer.

Figure 3:
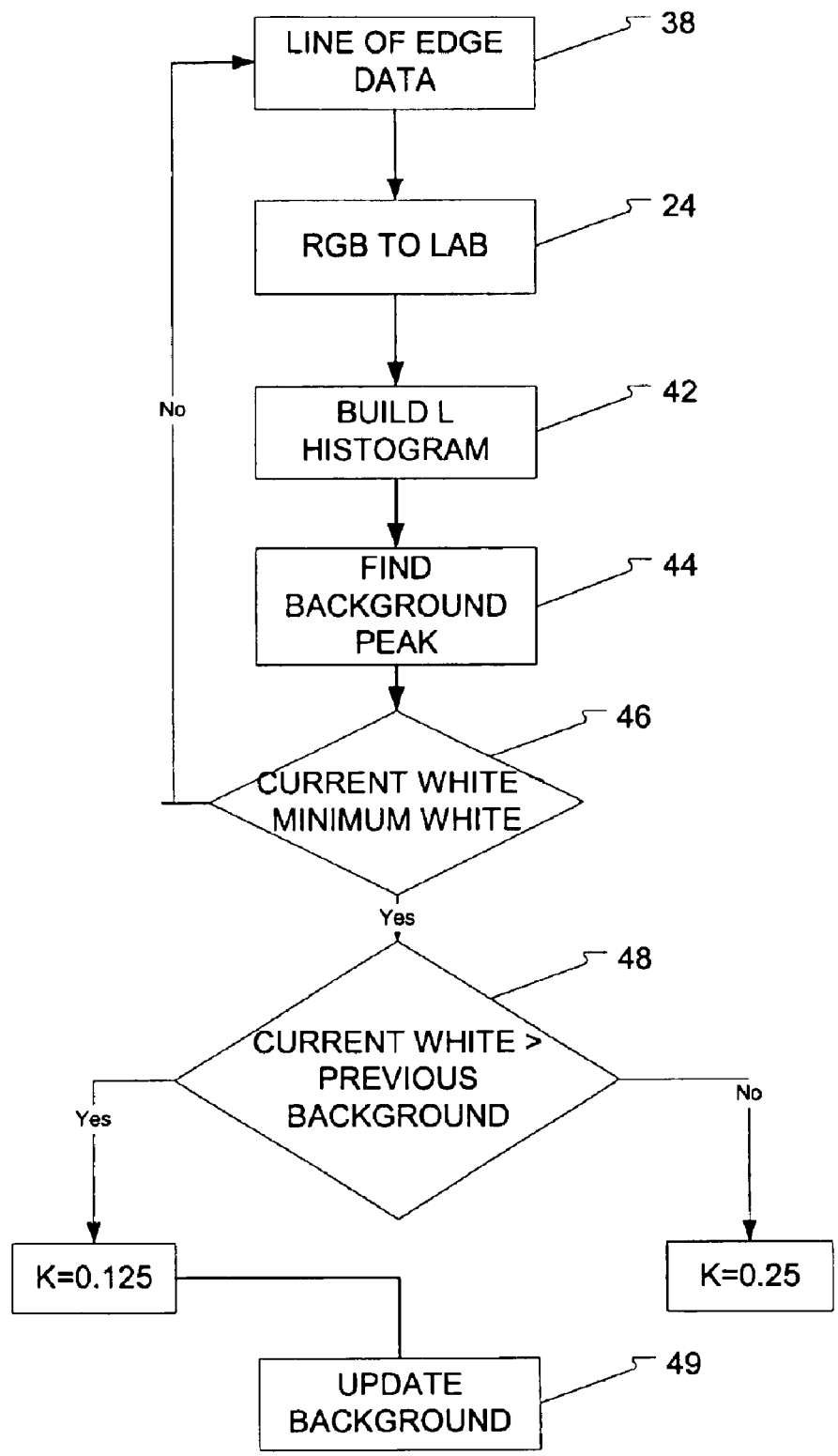
FIG. 3 shows a flowchart of one embodiment of a method for determining a background lightness level, in accordance with the invention.

As can be seen by this process, the mapping of the lightness values and the determination of the background level at 26 must be done very carefully. In removing the background, the first step is estimating the background lightness level. FIG. 3 illustrates one possible expansion of the process to estimate background level 26, using lead-edge data at 38. The lead-edge is usually the first half-inch of the page, where most documents have a top margin. In order to have an efficient hardware implementation, background estimation is processed line by line. The line of data is converted to LAB space at 24, the same process as in 24 of FIG. 2.

Figure 4:
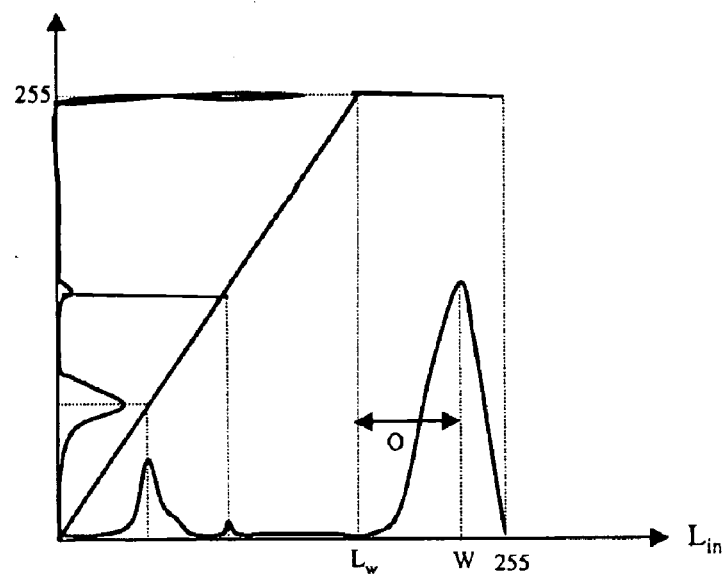
FIG. 4 shows a graph of lightness mapping in a background suppression process.
Figure 5:
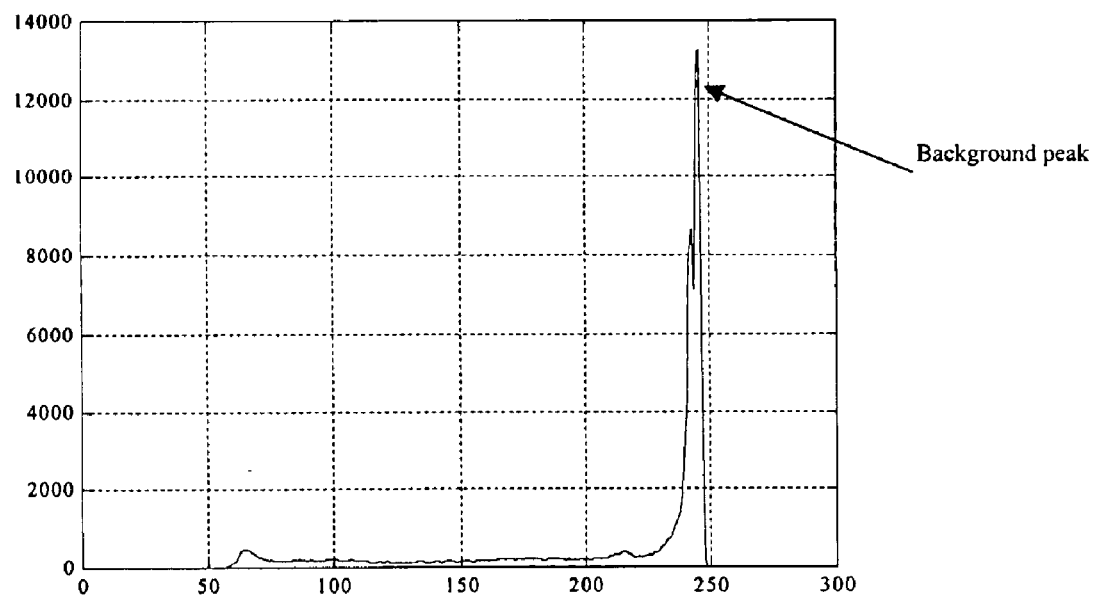
FIG. 5 shows a graph of a histogram showing a high peak value for determining a background lightness level.

The input RGB data is first converted to LAB typically using a 3×3 matrix or 3-D look-up-table (LUT). The lightness is mapped according to a function:

$$L_{out} = L_{in} * 255 / L_w \quad L_{in} \le L_w$$
$$L_{out} = 255 \quad\quad\quad L_{in} > L_w$$

Where $L_w$=white-offset. In one embodiment, the offset was chosen between 5–20 depending on the spread of the background histogram. An example of this lightness mapping function is shown in FIG. 4.

For each line, a histogram is constructed to estimate the background level at 42. The background level is defined to be the high peak value at 44, such as that shown in the histogram in FIG. 5.

Some documents, such as printed photographs, may not have a margin on the lead-edge. In this case, the detected white will be the peak of the image histogram rather than the background. If this estimated white is used for background removal, most of the highlight content would be removed as well. To prevent this from happening, a minimum white is used so that if the detected, or current, white is below the minimum white, it is not used in estimating document background level. This is shown at 46 in FIG. 3. If the current white is above the minimum white at 48 a further check is performed to determine if the current white is above the previous background level. This determines which adaptation constant is used. The new background is given by:

New white=old white*(1−k)+k*current white.

In one embodiment, for example, the k value is set to 0.25 when the current white is lower than the old white, and the value of 0.125 is used when the current white is higher than the old white. Selection of the numbers used is left to the system designers and are only intended as an example. This then updates the background as shown at 49.

For the first line, there is no previous white estimate, so an initial white value is used. The initial white is set so that most common originals are reproduced reasonably. The initial white is the default white when the lead-edge of the original is too dark as in the case of printed photograph. As an example, the initial white may be set to 230 and the minimum white may be set to 220.

This background mapping function is then used prior to the chroma adjustment process, as shown in FIG. 1. The chroma adjustment module shifts the LAB values as necessary to preserve highlight colors, as discussed above. The printer conversion module will convert the adjusted LAB data to CMYK, CMY, RGB or other desired output space.

Figure 6:
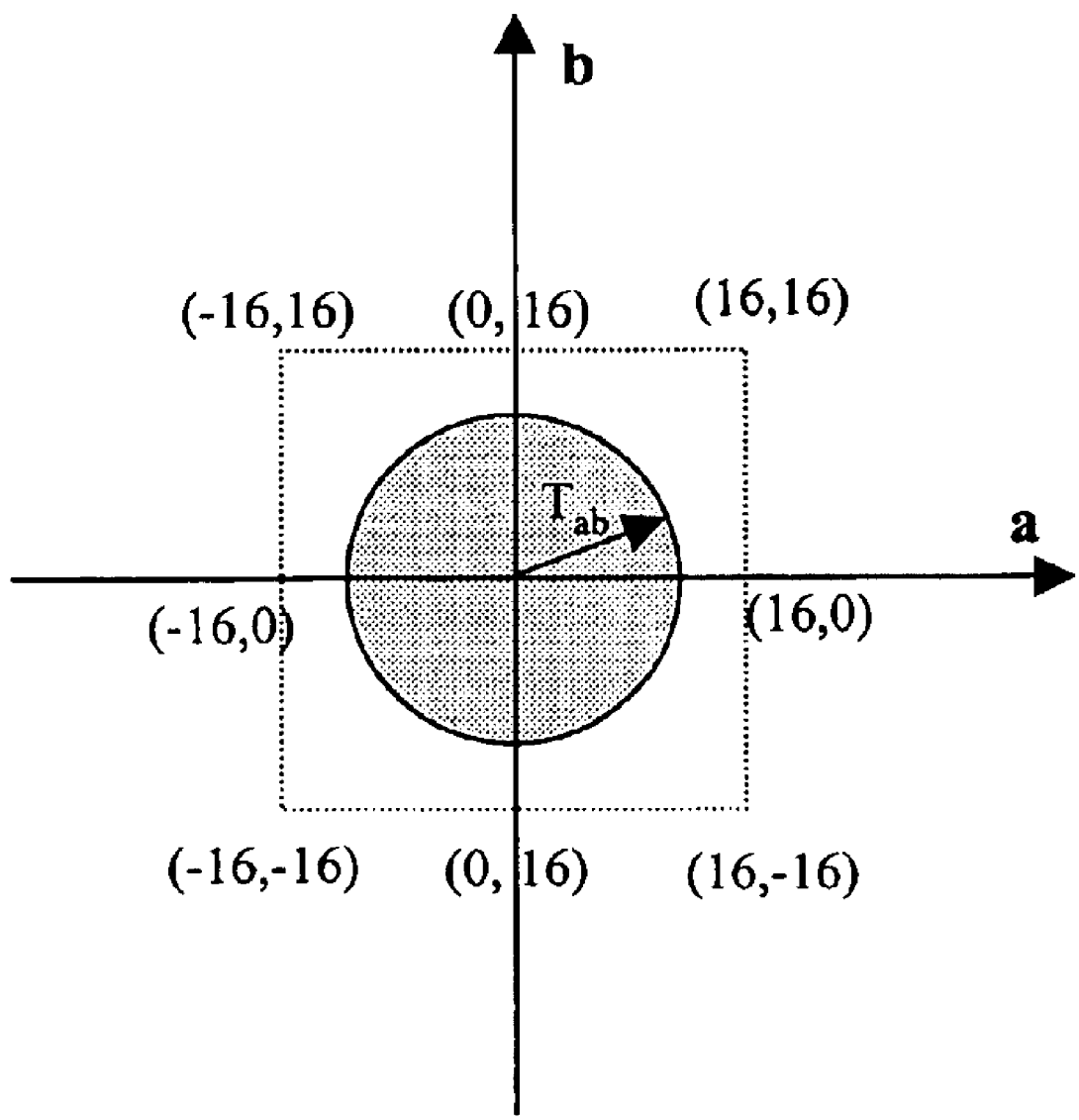
FIG. 6 shows a graph of the top lightness plane of a color table.

For example, in a LAB-to-CMYK module, each pixel is mapped to CMYK values via a three dimensional LUT. For background and some highlight colors, the top L plane (L=255) defines the color reproduction. FIG. 6 shows the central portion of color table values of the top L plane. For example, assume that a 17×17×17 table is used. This results in a grid point spacing to be 16. The color table is designed so that the background (L=255, a=0, and b=0) is mapped to C=0, M=0, Y=0, and K=0. As shown in FIG. 6, any input pixel with L of 255 and a and b values within the circle will be mapped to the center (L=255, a=0, and b=0). This ensures that the background is reproduced cleanly, without printing any CMYK dots.

An alternative approach would be to only process those pixels with lightness values less than 255 (L<255). For pixels for which L=255, the output would automatically be set to the appropriate values in the particular output space. For example, in the LAB-to-CMYK module example above, pixels for which L=255 would automatically have their output values set to C=0, M=0, Y=0 and K=0, bypassing the lookup table.

Some highlight colors may have chroma values above threshold, outside the circle of FIG. 6. Assuming the formulation $C=\sqrt{a^2+b^2}$, the chrominance (a and b) was preserved by the chrominance adjust module, but its L value was compressed by the lightness mapping to L'. In order to reproduce the highlight color, the color plane corresponding to L' (the top L plane) is adjusted so that any color that has not been removed is preserved. This is achieved by setting the color table entries near the neutral axis to much higher values than would be required according to a calorimetric reproduction scheme. This ensures that any color not removed by the chrominance adjustment module is reproduced with adequate density to be easily visible. In this manner, the printer resources are not wasted reproducing the background colors. At the same time, highlight colors are preserved.

Thus, although there has been described to this point a particular embodiment for a method and apparatus for background removal in color reproduction requirements, it is not intended that such specific references be considered as limitations upon the scope of this invention except in-so-far as set forth in the following claims.

What is claimed is:

1. A method for background adjustment, the method comprising:
   estimating a background lightness level in an original image;
   converting pixels in the original image to a luminance-chrominance color space, wherein pixels having lightness levels substantially equal to the background lightness level are mapped as background pixels such that their lightness values are set substantially equal to a value corresponding to white;
   comparing chroma values for the background pixels to at least one threshold;
   adjusting lightness levels for any background pixels having chroma values above a first threshold to a new lightness level indicating that color of that pixel is to be preserved, producing lightness adjusted pixels;
   removing chroma from any background pixels having chroma values below a second threshold indicating that the color of that pixel should be removed, producing color adjusted pixels; and
   converting to a color space of an output device, wherein conversion is performed on all pixels including any lightness adjusted pixels and color-adjusted pixels.

2. The method of claim 1, wherein estimating a background lightness level further comprises building histograms of each line of the original image and then determining a high peak value in the histograms.

3. The method of claim 2, wherein determining a high peak value in the histograms further comprises using a minimum white to determine if the high peak value is used in estimating overall background lightness level.

4. The method of claim 1, wherein the first and second thresholds are substantially equal to 20 for text mode, and 10 for all other modes.

5. The method of claim 1, wherein the value corresponding to white is 255.

6. The method of claim 5, wherein the new lightness level is substantially equal to 254.

7. The method of claim 1 wherein color is removed from a pixel by setting the chrominance components of that pixel value in the luminance-chrominance color space substantially equal to zero.

8. The method of claim 1, wherein the color space of the output device is CMYK space.

9. The method of claim 1, wherein the color space of the output device is CMY space.

10. The method of claim 1, wherein the color space of the output device is RGB space.

11. The method of claim 1, wherein the first and second thresholds are equal.

12. A color reproduction device, comprising:
   a scanning module operable to scan a color original and produce input data representative of the color original;
   a background suppression module operable to:
      determine a background lightness level; and
      map pixels of input data to luminance-chrominance color space such that pixels having a lightness level substantially equal to the background lightness level are mapped as background pixels having a lightness value corresponding to white;
   a chroma adjustment module, operable to:
      determine if chroma values for the background pixels are above a threshold;
      adjust any background pixels having a chroma value above the threshold to a lightness level different from the lightness corresponding to white; and
      remove chroma from any background pixels having a chroma value below the threshold; and
   an output conversion module, operable to convert all pixels in the luminance-chrominance color space to an output space.

13. The color reproduction device of claim 12, wherein the device is a copier.

14. The color reproduction device of claim 12, wherein the device is a fax machine.

15. The color reproduction device of claim 12, wherein the background suppression module includes lookup tables operable to map the pixels of input data to luminance-chrominance color space.

16. The color reproduction device of claim 15, wherein the lookup tables are only used on pixels with values other than the value corresponding to white.

* * * * *